(12) United States Patent  (10) Patent No.: US 8,257,024 B1
Phillips et al.  (45) Date of Patent: Sep. 4, 2012

(54) GEARED TURBOMACHINE FLUID DELIVERY SYSTEM

(75) Inventors: Kathleen R. Phillips, Coventry, CT (US); Thomas G. Phillips, Coventry, CT (US); Ethan K. Stearns, Mansfield, CT (US); Federico Papa, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/359,897

(22) Filed: Jan. 27, 2012

(51) Int. Cl.
*F01D 25/18* (2006.01)

(52) U.S. Cl. ....... 415/112; 415/175; 415/177; 184/6.12; 184/104.1

(58) Field of Classification Search ............ 415/111, 415/112, 175, 177; 184/6.12, 6.22, 104.1
See application file for complete search history.

(56) References Cited

U.S. PATENT DOCUMENTS

| | | | | |
|---|---|---|---|---|
| 3,133,693 A | * | 5/1964 | Holl | 184/6.11 |
| 3,903,690 A | * | 9/1975 | Jones | 60/39.08 |
| 6,551,082 B2 | * | 4/2003 | Douzono et al. | 418/83 |
| 6,651,441 B2 | | 11/2003 | Reuter et al. | |

* cited by examiner

*Primary Examiner* — Ninh H Nguyen
(74) *Attorney, Agent, or Firm* — Carlson, Gaskey & Olds PC

(57) ABSTRACT

An exemplary geared turbomachine fluid delivery system includes a first fluid path configured to communicate fluid from a supply to a gear system of a geared turbomachine, and a second fluid path configured to communicate fluid from the supply to the gear system. The fluid introduced to the gear system by the first fluid path is cooler than that the fluid introduced to the gear system by the second fluid path.

7 Claims, 3 Drawing Sheets

GEARED TURBOMACHINE FLUID DELIVERY SYSTEM

BACKGROUND

This disclosure relates to a fluid delivery system and, in particular, a delivery system for fluid within a geared turbomachine.

Turbomachines, such as gas turbine engines, typically include a fan section, a turbine section, a compressor section, and a combustor section. Turbomachines may employ a geared architecture connecting the fan section and the turbine section. Journal pins hold planet gears between the sun gear and a ring gear within a planet carrier.

Interfaces within the geared architecture need to be cooled and lubricated as is known. The different interfaces may have different cooling and lubrication requirements.

SUMMARY

A geared turbomachine fluid delivery system according to an exemplary aspect of the present disclosure includes, among other things, a first fluid path configured to communicate fluid from a supply to a gear system of a geared turbomachine, and a second fluid path configured to communicate fluid from the supply to the gear system. The fluid introduced to the gear system by the first fluid path is cooler than that the fluid introduced to the gear system by the second fluid path.

In a further non-limiting embodiment of the foregoing geared turbomachine fluid delivery system, the system may include a valve that controls flow from the supply to the first fluid path, to the second fluid path, or both.

In a further non-limiting embodiment of any of the foregoing geared turbomachine fluid delivery systems, the system may include fluid moving along the first fluid path moving through a cooler assembly.

In a further non-limiting embodiment of any of the foregoing geared turbomachine fluid delivery systems, the system may include a cooler assembly including an air-oil cooler, a fuel-oil cooler, or both.

In a further non-limiting embodiment of any of the foregoing geared turbomachine fluid delivery systems, the system may include a third fluid path configured to communicate some fluid that has moved through the cooler assembly from the first fluid path to the second fluid path.

In a further non-limiting embodiment of any of the foregoing geared turbomachine fluid delivery systems, the system may include a first fluid path configured to communicate fluid from the supply to a journal bearing area of the gear system.

In a further non-limiting embodiment of any of the foregoing geared turbomachine fluid delivery systems, the system may include a second fluid path is configured to communicate fluid from the supply to a gear mesh area of the gear system.

In a further non-limiting embodiment of any of the foregoing geared turbomachine fluid delivery systems, the system may include a supply comprising fluid scavenged from the gear system.

In a further non-limiting embodiment of any of the foregoing geared turbomachine fluid delivery systems, the system may include fluid that is oil.

A gas turbine engine according to an exemplary aspect of the present disclosure includes, among other things, a cooler assembly, a gear system that rotatably couples a turbine shaft to a fan of a turbine engine. The first portion of the gear system is cooled by fluid that has all moved through the cooler assembly, and the second portion of the gear system is cooled by a mixture of fluid that has moved through the cooler assembly and fluid that has not moved through the cooler assembly.

In a further non-limiting embodiment of the foregoing gas turbine engine, the gas turbine engine may include fluid that has moved through the cooler assembly and mixed with fluid that has not moved through the cooler assembly outside the gear system before being directed to the second portion of the gear system.

In a further non-limiting embodiment of any of the foregoing gas turbine engines, the gas turbine engine may include a first portion of the gear system that includes journal bearings.

In a further non-limiting embodiment of any of the foregoing gas turbine engines, the gas turbine engine may include a cooler assembly comprising an air-oil cooler, a fuel-oil cooler, or both.

In a further non-limiting embodiment of any of the foregoing gas turbine engines, the gas turbine engine may include fluid that is oil scavenged from the gear system.

A method of cooling a gear system of a geared turbomachine according to another exemplary aspect of the present disclosure includes, among other things, separating a supply of fluid into a first portion and a second portion, cooling the first portion more than the second portion, and communicating the first portion and the second portion to different areas of a gear system.

In a further non-limiting embodiment of the foregoing method of cooling a gear system of a geared turbomachine, the method may include moving the first portion through a cooler assembly to cool the first portion and mixing the second portion with fluid that has moved through the cooler assembly to cool the second portion.

In a further non-limiting embodiment of any of the foregoing methods of cooling a gear system of a geared turbomachine, the method may include communicating the first portion to a journal bearing area of the gear system and communicating the second portion to a gear mesh area of the gear system.

In a further non-limiting embodiment of any of the foregoing methods of cooling a gear system of a geared turbomachine, the method may include supply that is fluid scavenged from the gear system.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
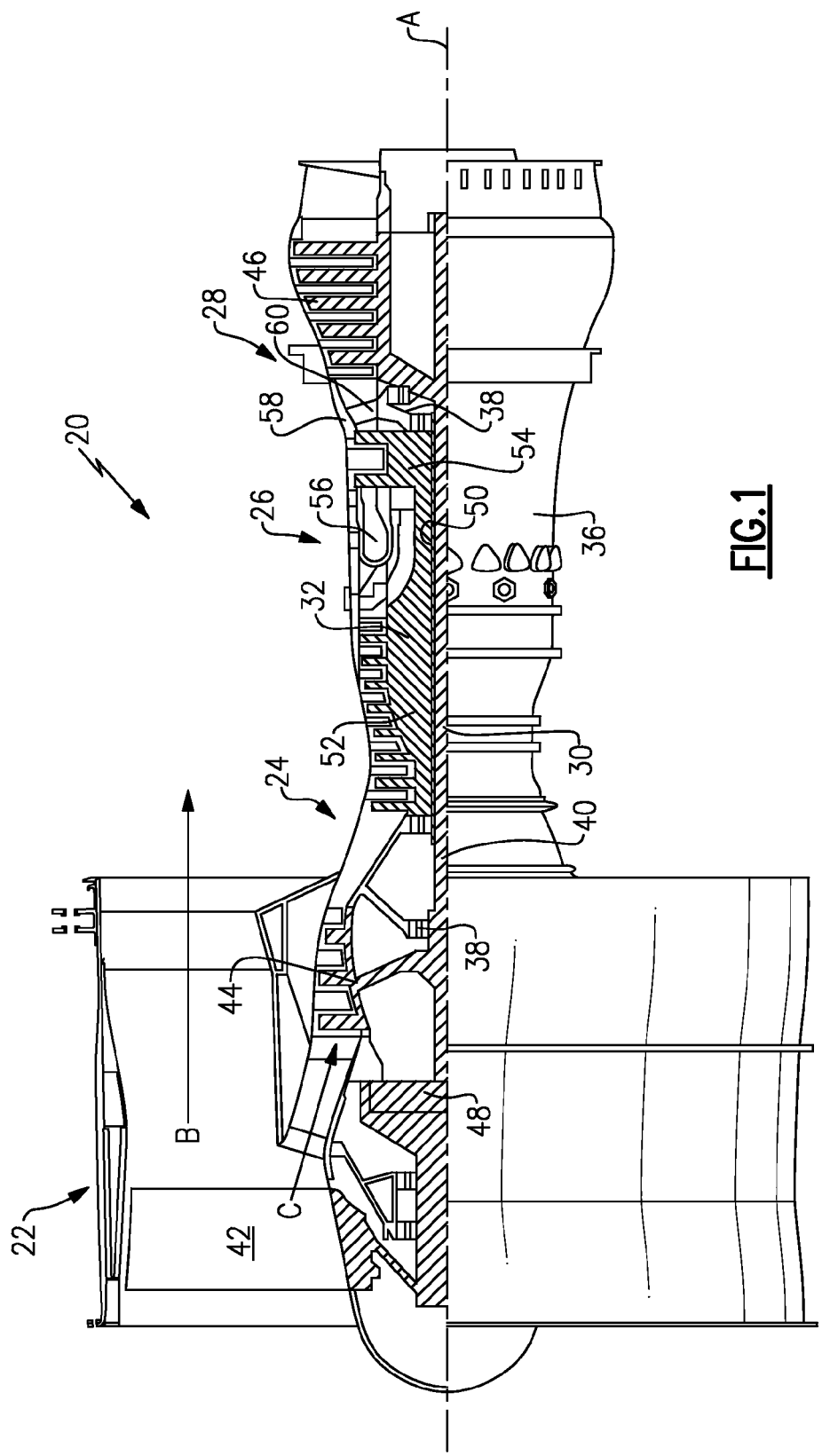
FIG. 1 shows a partial section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, the fan section 22 drives air along a bypass flowpath B while the compressor section 24 drives air along a core flowpath C. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The combustion section 26 includes a circumferentially distributed array of combustors 56 generally arranged axially between the high-pressure compressor 52 and the high-pressure turbine 54.

A mid-turbine frame 58 of the engine static structure 36 is generally arranged axially between the high-pressure turbine 54 and the low-pressure turbine 46. The mid-turbine frame 58 supports bearing systems 38 in the turbine section 28.

The inner shaft 40 and the outer shaft 50 are concentric and rotate via bearing systems 38 about the engine central longitudinal axis A, which is collinear with the longitudinal axes of the inner shaft 40 and the outer shaft 50.

In the example engine 20, the core airflow C is compressed by the low-pressure compressor 44 then the high-pressure compressor 52, mixed and burned with fuel in the combustors 56, then expanded over the high-pressure turbine 54 and low-pressure turbine 46. The mid-turbine frame 58 includes airfoils 60 within the path of the core airflow. The high-pressure turbine 54 and the low-pressure turbine 46 rotatably drive the respective high-speed spool 32 and low-speed spool 30 in response to the expansion.

In some non-limiting examples, the engine 20 is a high-bypass geared aircraft engine. In a further example, the engine 20 bypass ratio is greater than about six (6:1).

The geared architecture 48 of the example engine 20 includes an epicyclic gear train, such as a planetary, star, or differential gear system. The example epicyclic gear train has a gear reduction ratio of greater than about 2.2 (i.e., 2.2:1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10:1), the fan diameter is significantly larger than that of the low pressure compressor 44, and the low-pressure turbine 46 has a pressure ratio that is greater than 5 (5:1). The geared architecture 48 of this embodiment is an epicyclic gear train with a gear reduction ratio of greater than about 2.4 (i.e., 2.4:1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example engine 20 is less than about 1150 fps (351 m/s).

Figure 2:
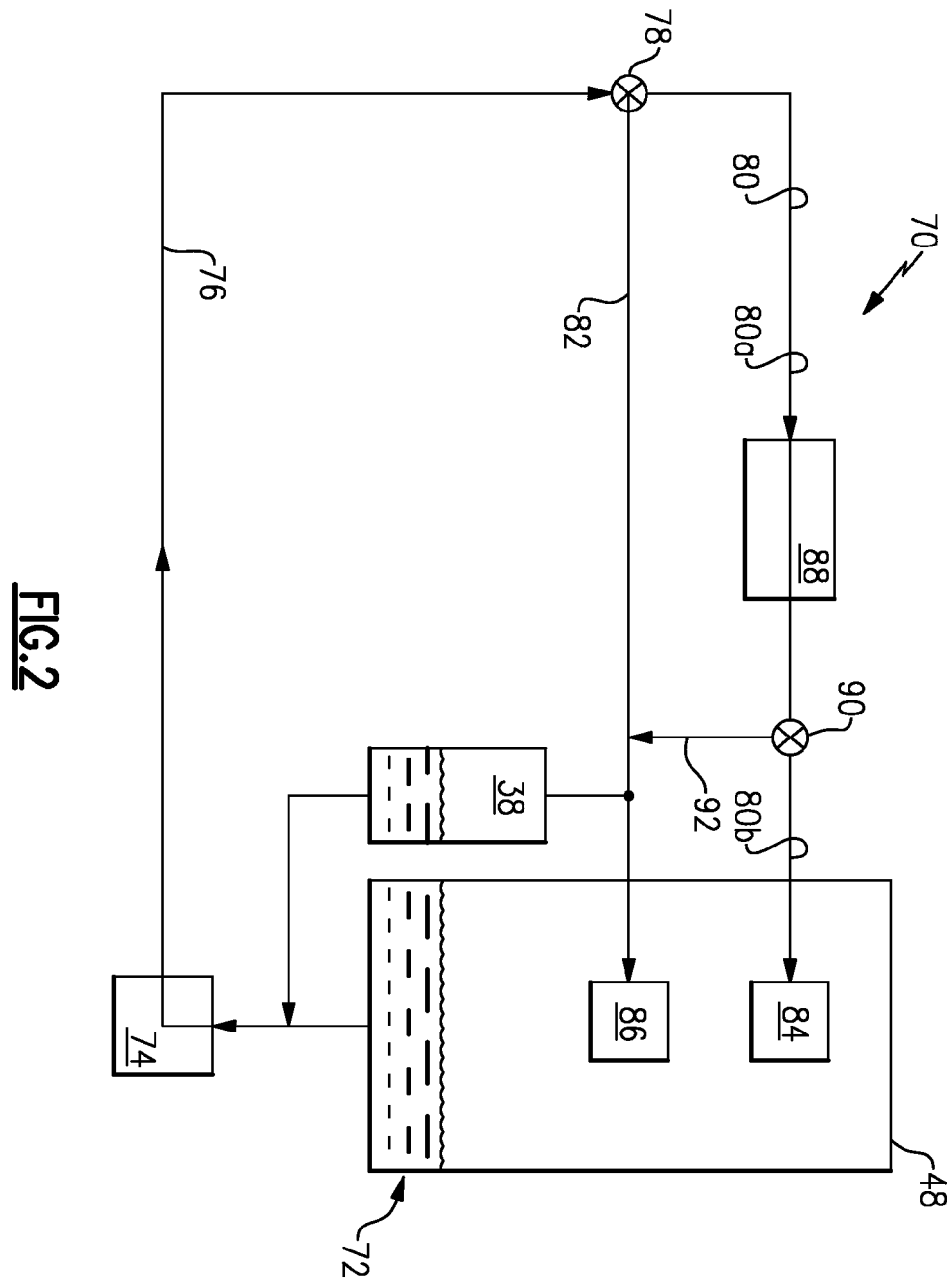
FIG. 2 shows a highly schematic view of a geared turbomachine cooling system.

Referring to FIG. 2 with continuing reference to FIG. 1, an example fluid delivery system 70 is used to communicate a fluid to areas of the engine 20. In this example, the fluid delivery system 70 communicates a fluid that cools and lubricates to the geared architecture 48. The fluid is oil in this example.

The example fluid delivery system 70 receives the fluid that has been scavenged from a sump area 72 associated with the geared architecture 48, bearings systems 38 of the engine 20, or both. A pump 74 is used, in this example, to pressurize and move fluid from the sump area 72. The pump 74 moves the fluid along a supply path 76 to a valve or fixed orifice (hereinafter collectively referred to as a "valve") 78, which directs the fluid to a first fluid path 80 or a second fluid path 82. A person having skill in this art and the benefit of this disclosure would understand how to select a valve suitable for dividing flow moving along a single path into multiple paths.

In some examples, 30-40% of the fluid is directed to the second fluid path 82 and the remaining fluid is directed to the first fluid path 80. In one specific example, 38% of the fluid is directed (by the valve 78) to the second fluid path 82.

In this example, the first fluid path 80 communicates fluid to a journal bearing areas 84 of the geared architecture 48, and the second fluid path 82 communicates fluid to gear mesh areas 86 of the geared architecture 48 or other bearing systems 38 within the engine 20. The fluid communicated to the journal bearing areas 84 is cooler than the fluid communicated to the gear mesh areas 86 and the other bearing systems 38.

The first fluid path 80 extends through a cooler assembly 88, which cools the fluid moving along the first fluid path 80 relative to the fluid moving along the second fluid path 82.

After moving through the cooler assembly 88, some of the fluid moving along the first fluid path 80 is redirected by a valve or fixed orifice (hereinafter collectively referred to as a "valve") 90 into a third fluid path 92. Fluid from the third fluid path 92 is mixed with the fluid moving along the second fluid path 82 to cool the fluid moving along the second fluid path 82. The third fluid path 92 extends from the valve 90 to the second fluid path 82.

The fluid that is not redirected by the valve 90 continues to flow to the journal bearing areas 84. In one example, 43% of the fluid is not redirected by the valve 90. The first fluid path

80 includes a portion 80a extending from the valve 78 to the valve 90, and a portion 80b extending from the valve 90 the journal bearing areas 84.

As can be appreciated, the fluid moving from the first fluid path 80 is cooler than the fluid moving from the second fluid path 82. In this example, the relative difference in temperatures is because all the fluid moving from the first fluid path 80 to the journal bearing areas 84 has moved through the cooler assembly 88, but only some of the fluid moving from the second fluid path 82 to the gear mesh areas 86 has moved through the cooler assembly 88. In this example, the fluid moved to the journal bearing areas 84 is about 212° F. (100° C.), and the fluid is moved to the gear mesh areas 86 is about 240° F. (115.55° C.). The fluid in the scavenge area 72 is about 266° F. (130° C.).

The example geared architecture 48 includes journal pins that support planet/stars gears within a carrier. The journal bearing areas 84 of the example gear architecture 48 refer to at least the interfaces between these journal bearings and the planet gears, and specifically the lubricant film associated within each of the journal pins. By contrast, the gear mesh areas 86 refer to at least the areas of the planet gears meshing with a sun gear or the carrier.

Figure 3:
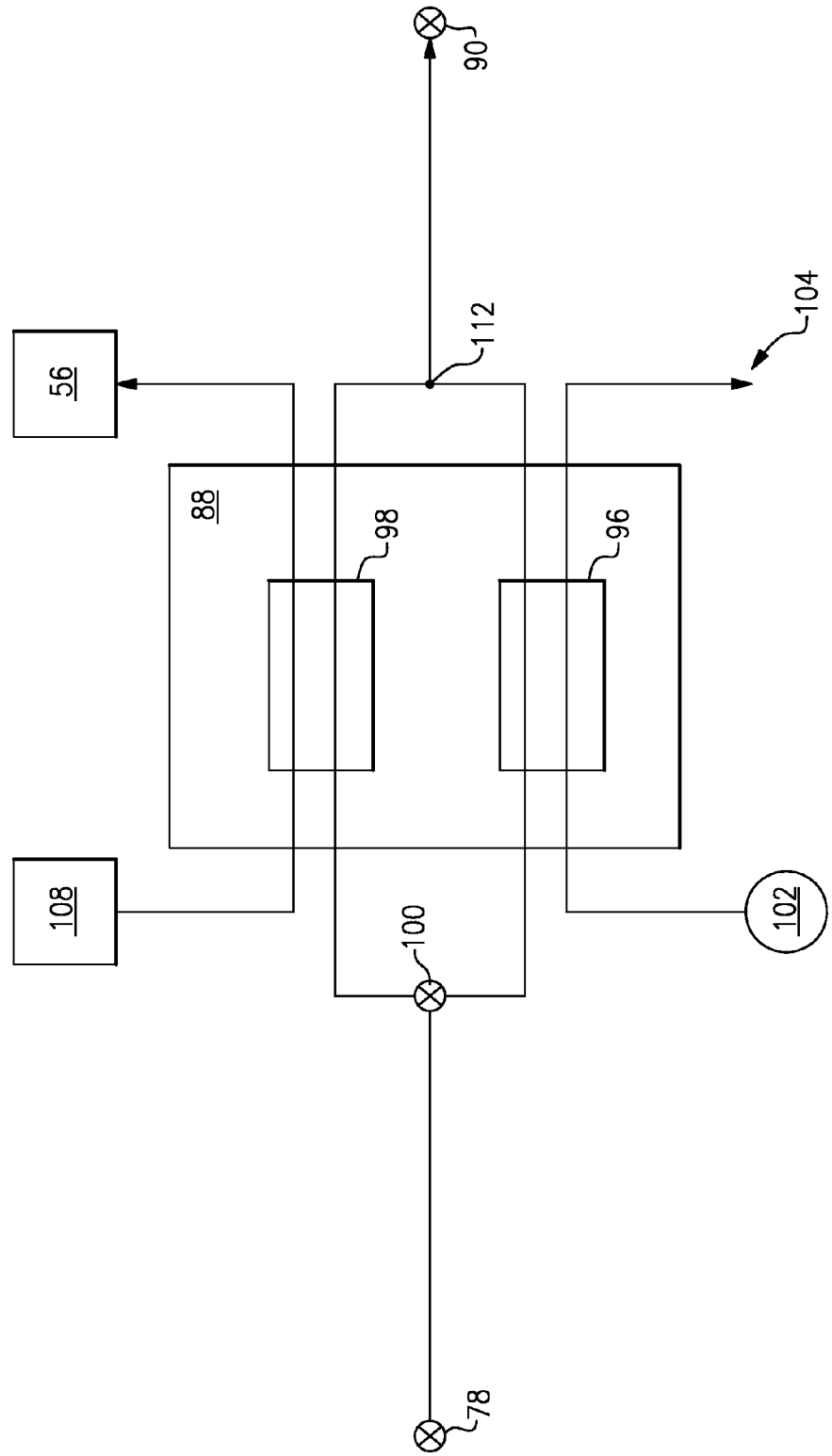
FIG. 3 shows a schematic view of another example geared turbomachine cooling system.

Referring to FIG. 3 with continuing reference to FIGS. 1 and 2, in this example, the cooler assembly 88 includes an air-oil cooler 96 and a fuel-oil cooler 98. A modulating valve 100 controls relative amounts of fluid entering the cooler 96 and the cooler 98.

The air-oil cooler 96 receives a supply of air from an air supply 102, which is bleed air from the engine 20 in this example. Within the air-oil cooler 96, the air carries thermal energy away from the fluid. The heated air is exhausted to atmosphere at 104, for example.

The fuel-oil cooler 98 receives a supply of fuel from a fuel supply 108. Within the fuel-oil cooler 98, the fuel carries thermal energy away from the fluid. The heated fuel is eventually communicated to the combustor 56.

In this example, using both the air-oil cooler 96 and fuel-oil cooler 98, rather than exclusively the fuel-oil cooler 98, ensures that the fluid does not overheat the fuel. The modulating valve 100 redirects fluid to the air-oil cooler 96 to prevent overheating the fuel Although the modulating valve 100 divides flow between the air-oil cooler 96 and the fuel-oil cooler 98, fluid traveling through each of the coolers 96 and 98 is still considered to be communicating along the first fluid path 80. After moving through the coolers 96 and 98, the fluid is combined at point 112 and communicated to the valve 90.

In other examples, some or all of the fluid exiting one of the coolers 96 or 98 may communicate directly along the third fluid path 92 to the second fluid path 82. That is, combining all the fluid that has moved through the coolers 96 and 98 is not necessary.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine, comprising:
   a cooler assembly;
   a gear system that rotatably couples a turbine shaft to a fan of a turbine engine, wherein a first portion of the gear system is cooled by fluid that has all moved through the cooler assembly, and wherein a second portion of the gear system is cooled by a mixture of fluid that has moved through the cooler assembly and fluid that has not moved through the cooler assembly.

2. The gas turbine engine of claim 1, wherein fluid that has moved through the cooler assembly is mixed with fluid that has not moved through the cooler assembly outside the gear system before being directed to the second portion of the gear system.

3. The gas turbine engine of claim 1, wherein the first portion of the gear system includes journal bearings.

4. The gas turbine engine of claim 1, wherein the cooler assembly comprises an air-oil cooler, a fuel-oil cooler, or both.

5. The gas turbine engine of claim 1, wherein the fluid is oil scavenged from the gear system.

6. A method of cooling a gear system of a geared turbomachine including:
   separating a supply of fluid into a first portion and a second portion;
   cooling the first portion more than the second portion;
   communicating the first portion and the second portion to different areas of a gear system; and
   communicating the first portion to a journal bearing area of the gear system and communicating the second portion to a gear mesh area of the gear system.

7. A geared turbomachine fluid delivery system, comprising: a first fluid path configured to communicate fluid from a supply to a gear system of a geared turbomachine; and a second fluid path configured to communicate fluid from the supply to the gear system, wherein the fluid introduced to the gear system by the first fluid path is cooler than that the fluid introduced to the gear system by the second fluid path, and the first fluid path is configured to communicate fluid from the supply to a journal bearing area of the gear system.

\* \* \* \* \*